Dec. 29, 1936.  J. BRAUNWALDER  2,065,790
INTERNAL COMBUSTION ENGINE
Filed March 6, 1933  3 Sheets-Sheet 2

John Braunwalder
INVENTOR
BY
ATTORNEY

Dec. 29, 1936.  J. BRAUNWALDER  2,065,790
INTERNAL COMBUSTION ENGINE
Filed March 6, 1933   3 Sheets-Sheet 3

John Braunwalder
INVENTOR
BY
ATTORNEY

Patented Dec. 29, 1936

2,065,790

UNITED STATES PATENT OFFICE 2,065,790

INTERNAL COMBUSTION ENGINE

John Braunwalder, Los Angeles, Calif.

Application March 6, 1933, Serial No. 659,856

3 Claims. (Cl. 123—58)

My invention relates to devices adapted to create power from the combustion of liquid or gaseous fuel and the object thereof is to produce an internal combustion engine comprising a simple and easily maintained mechanism.

A further object thereof is to create a compact unit composed of a plurality of co-acting individual internal combustion engines providing means for perfectly balancing the reciprocal inertia and explosion energy of the moving pistons therein.

A further object is to produce an internal combustion engine in which gyroscopic balancing mediums are so applied as to provide means for resisting the torsional deflection of said engine due to variable power loading thereof.

A further object is to provide an engine assembly wherein each individual cylinder assembly may be independently attached to or removed from said assembly with a minimum of labor and to provide a simple system of pressure oiling adapted to lubricate all moving parts in said cylinder assemblies.

A further object is to provide an effective circulation of air around all heated portions of said engine assembly and to control the working temperature thereof.

A further object is to provide a flexible means of operating a valve mechanism whereby any misalignment thereof may be effectively compensated.

A further object is to provide a novel power assembly in which a plural group of engine units may be adapted to drive a unit power transmission.

These and other objects are attained by the devices shown in the illustrations, in which Fig. 1 shows a sectional view through a cylinder assembly.

Figure 1:
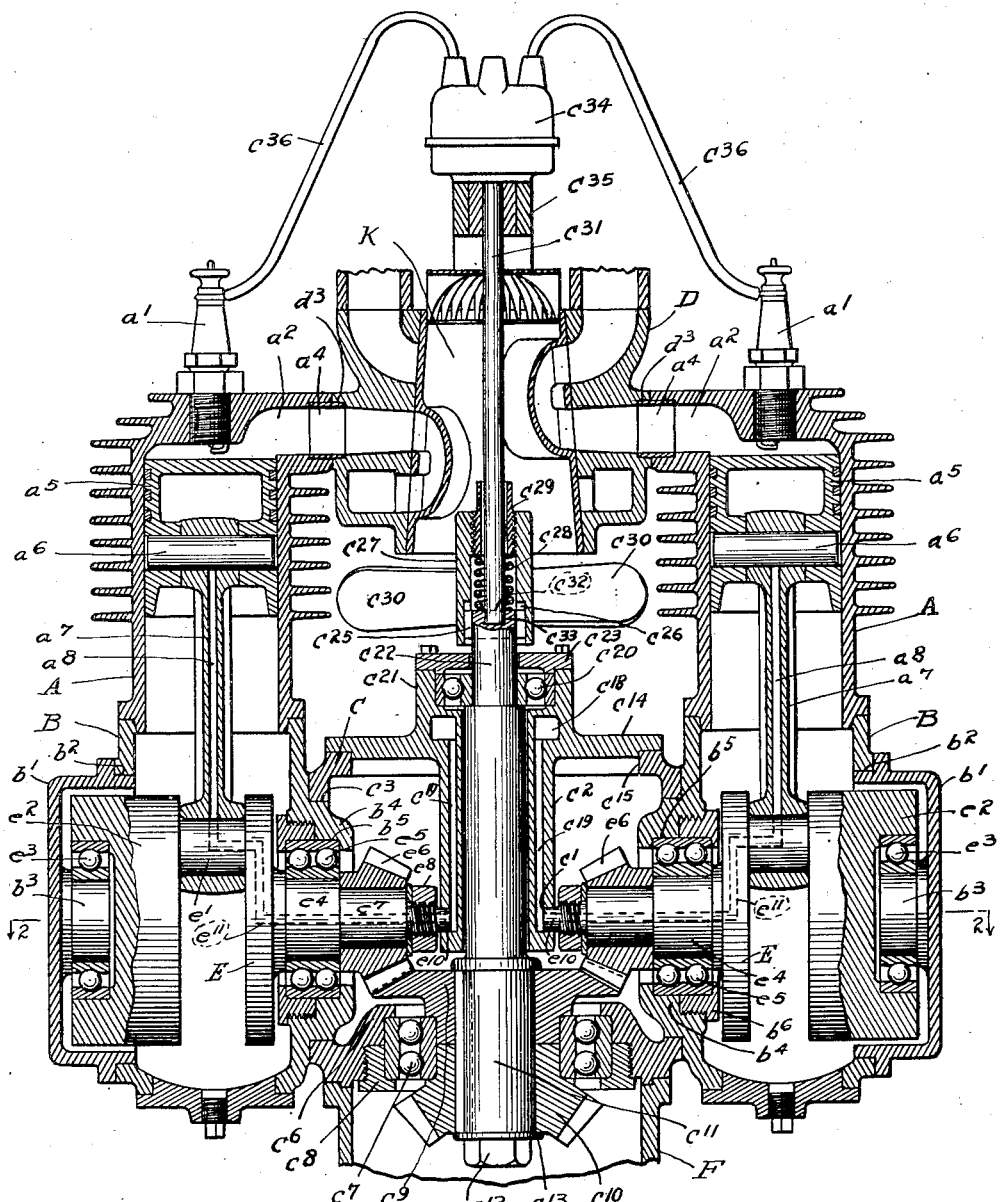
Figure 2:
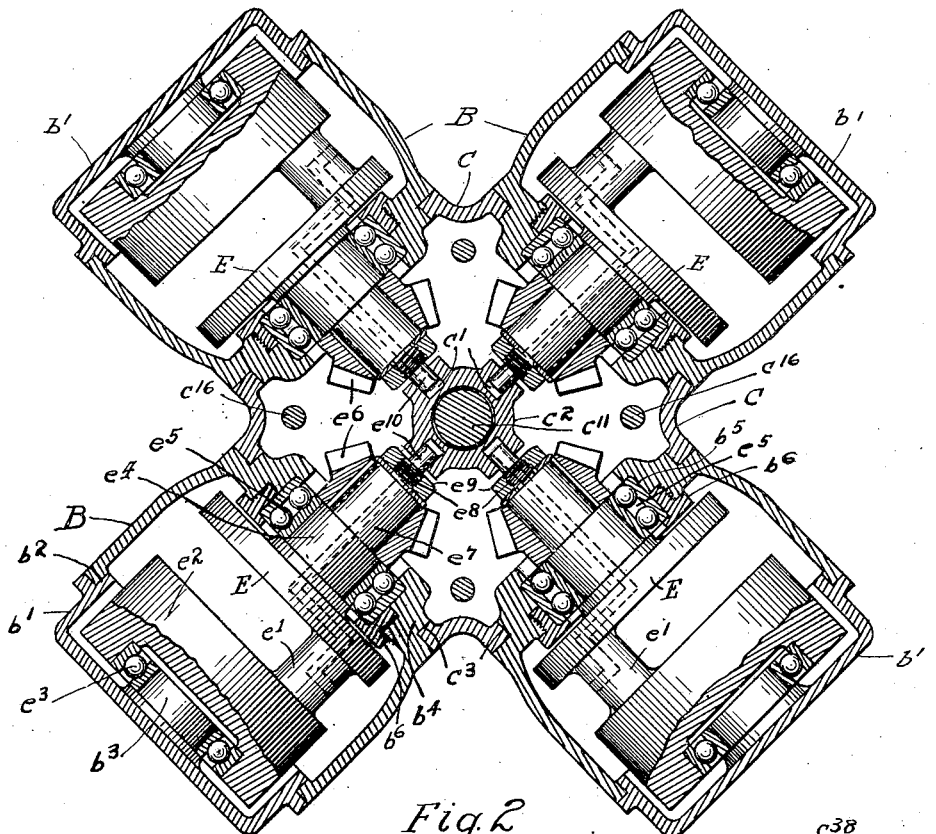
Fig. 2 shows a plan section on line 2—2 of Fig. 1.

Referring to Fig. 1 of Sheet 1 a cylinder A is suitably secured to a crankcase B which is secured to a central housing C.

Figure 5:
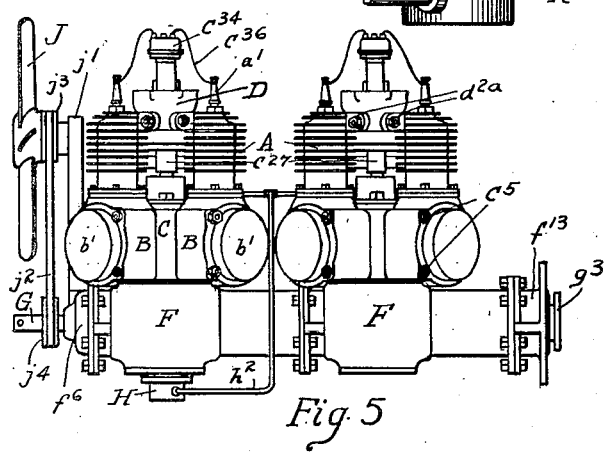
Fig. 5 shows an assembly of a plural group of engine units.
Figure 6:
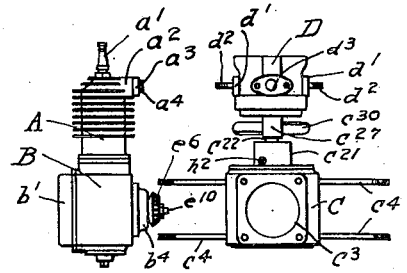
Fig. 6 shows a cylinder unit removed from the central portion of the engine and a partial view of said central portion.

The cylinder A is provided at its firing end with a suitable ignition device $a1$ and an extended passage $a2$ which terminates in a flange $a3$ as is more clearly shown in Figures 5 and 6 of Sheet 3 and said flange $a3$ is secured to a portblock D by means of the flange $d1$ and the stud bolts $d2$.

A thimble $a4$ is suitably pressed gastight into said passage $a2$ and is slightly tapered on its outer end to fit into a taper seat $d3$ in the portblock D.

A piston $a5$ is slidably fitted into said cylinder A and is provided with a wristpin $a6$ on which one end of a connecting rod $a7$ is movably mounted.

The other end of said connecting rod $a7$ is rotatably mounted on a crankpin $e1$ of the rotating element E, which said rotating element E comprises a balancing medium $e2$ in which a ball bearing $e3$ is suitably fitted, and a bearing support $e4$ on which a ball bearing $e5$ is fitted.

A pinion $e6$ is suitably secured to the stub shaft $e7$ which is formed integrally to the end of the bearing support $e4$, and said stub shaft $e7$ is provided at the end thereof with a threaded portion $e8$ on which a nut $e9$ is threaded to secure said pinion $e6$ to the stub shaft $e7$.

A stub projection $e10$ extends outwardly from the threaded portion $e8$ and is adapted to rotate in an aperture $c1$ which is suitably formed into a central oil chamber $c2$.

A removable crankcase cover $b1$, which is attached to the outer opening $b2$ of the crankcase B, is provided at its central portion with a stub pin $b3$ on which the inner race of the ball bearing $e3$ is mounted to form a support for one end of the rotating element E.

A projection $b4$ is provided on the inner side of the crankcase B which is adapted to fit closely into an opening $c3$ of the central housing C.

A suitable recess $b5$ is provided within said projection $b4$ and the outer race of the ball bearing $e5$ is suitably fitted therein, thus forming a support for the inner end of the rotating element E.

A locknut $b6$ is suitably threaded into the inner side of the projection $b4$ and serves to retain the ball bearing $e5$ in a fixed relation thereto.

As is more clearly illustrated in Fig. 6, said cylinder A and crankcase B with its contained moving parts may be removed from or attached to said central housing C and secured thereto by means of the stud bolts $c4$ and the nuts $c5$ thereon.

Similarly the flange $a3$ on the cylinder A may be secured to the flange $d1$ of the portblock D by means of the stud bolts $d2$ and the nuts $d2a$.

The central housing C is provided at its lower portion with an inward projection $c6$ having a suitable recess in which the outer race of a ball bearing $c7$ is fitted, and a lock nut $c8$ is threaded into the lower portion of the projection $c6$ to secure said ball bearing $c7$ in a fixed position thereto.

A master gear $c9$ which meshes with the pinion $e6$ which is secured to the rotating element E is fitted into the upper half of said ball bearing $c7$ and a drive pinion $c10$ is fitted into the lower half thereof, and a master shaft $c11$ extending through said master gear $c9$ and drive pinion $c10$ is provided with a fixed collar adjacent to said master gear $c9$ and with a nut $c12$ and washer $c13$ adjacent to said drive pinion $c10$ is adapted to secure said master gear $c9$ and drive pinion $c10$ in fixed relation to said ball bearing $c7$.

The central oil chamber $c2$ is adapted to surmount said master shaft $c11$ and is provided with a flanged portion $c14$ at its upper end which is adapted to close the opening $c15$ of the central housing C and is secured thereto by means of the stud bolts $c16$ and the nuts $c17$.

A circular oil chamber $c18$ is provided in said flanged portion $c14$ and oil grooves $c19$ extend downwardly therefrom to the aperture $c1$.

An oil hole $e11$ in the stub projection $e10$ of the rotating element E extends to the bearing surfaces of the crank pin $e1$ and communicates with an oil hole $a8$ which extends through the connecting rod $a7$ from said crank pin $e1$ to the wrist pin $a6$ and serves as a means of supplying lubricants to the bearing portions thereof.

A ball bearing $c20$ is suitably fitted into the upper portion $c21$ of the oil chamber $c2$ and is adapted to support the upper end $c22$ of the master shaft $c11$.

A cover plate $c23$ is suitably fitted over said ball bearing $c20$ and secures same to the upper portion $c21$ of the oil chamber $c2$.

The upper end $c22$ of said master shaft $c11$ is provided with a key slot $c24$ in which a key $c25$ is fitted and is adapted to engage in the keyslots $c26$ in a valve drive member $c27$, the lower end of which surmounts said upper end $c22$ of the master shaft $c11$ and is supported thereon by a compression spring $c28$ which is located in a chamber formed in said valve drive member $c27$.

An adjusting nut $c29$ which is threaded into the upper portion of the valve drive member $c27$ is adapted to bear on the upper portion of said compression spring $c28$ and serves to adjust the pressure thereof.

Fan blades $c30$ are suitably provided on said valve drive member $c27$ which are adapted to create an upward circulation of air within a group of cylinders and serves to cool the heated portions thereof.

A timer shaft $c31$ passes through the adjusting nut $c29$ and is provided at its lower end with a slotted groove $c32$ which fits over the key $c25$ and said timer shaft $c31$ fits into a hole $c33$ in the upper end $c22$ of the master shaft $c11$.

Said timer shaft $c31$ extends upwardly and into a timer $c34$ of usual construction which is suitably mounted on a bracket $c35$ which is secured to the port block D.

Suitable wires $c36$ connect said timer $c34$ with the ignition devices $a1$ on the cylinder A.

The central housing C is adapted to be secured to a drive chamber F by means of the stud bolts $c16$ and the nuts $c17$ and the drive pinion $c10$ is adapted to mesh with a drive gear $f1$ which is fitted into the inner race of a ball bearing $f2$ whose outer race is fitted into a recess $f3$ in the drive chamber F.

A drive shaft G is fitted within said drive gear $f1$ and is secured thereto by the key $f4$ and held in longitudinal position thereto by the nut $g1$ which is threaded on the thread portion $g2$ on the drive shaft G.

The drive chamber F is provided on one end thereof with a flanged portion $f5$ to which a shaft support cap $f6$ is secured by the bolts $f7$ and nuts $f7a$.

Axial alignment of the shaft support cap $f6$ is secured by a recess $f8$ formed therein into which a lip portion $f9$ on the drive chamber F is fitted.

A ball bearing $f10$ is fitted into a recess $f11$ formed in said shaft support cap $f6$ and supports in the inner race thereof one end of the drive shaft G, which at the other end thereof is tapered into a drive flange $g3$ and is secured thereto by the key $g4$ and the lock nut $g5$ which is threaded to the end of said drive flange $g3$ and bears with a recess $g6$ against the collar $g7$ with which the drive shaft G is suitably provided.

A bearing recess $g8$ is provided on said drive flange $g3$ over which the inner race of a ball bearing $g9$ fits, while the outer race thereof is fitted into a recess $f12$ which is provided in a transmission flange $f13$ which is bolted to the flange $f14$ on the drive chamber F by means of the bolts $f15$ and the nuts $f16$.

A spacer ring $f17$ is adapted to fit into a recess $f18$ in the drive chamber F and is provided with a lipped portion $f19$ which fits into the recess $f12$ and between the ball bearing $g9$ and the drive member F and fits over the lock nut $g5$ with a grooved portion $f20$ in which a suitable grease seal may be provided.

A similar grease seal may be provided in the grooved portion $f21$ which is formed on the transmission flange $f13$ and also in the grooved portion $f22$ on the shaft support cap $f6$.

A circular opening $f23$ is provided in the lower portion of the drive chamber F to which is fitted a pump flange $f24$ and to which an oil circulating pump H is secured.

Said circulating pump H is provided with an intake opening $h1$ which opens into the drive chamber F and a discharge pipe $h2$ which connects to the upper portion $c21$ of the oil chamber $c2$ and provides an oil supply thereto as is shown in Figs. 5 and 6.

A pump shaft $h3$ which extends into the drive chamber F and is supported by the yoke $h4$ has secured to the end thereof a gear $h5$ which meshes with a portion of the drive gear $f1$ on the drive shaft G and is adapted to be rotated thereby.

A fan J which is suitably mounted on a bracket $j1$ and is rotated by the belt $j2$ which fits into a grooved pulley $j3$ on said fan J and a similar pulley $j4$ secured to the drive shaft G provides means for circulating air around the heated portions of the cylinders A and the port block D.

As is shown in Fig. 5, plural groups of cylinder assemblies may be combined into a single operating unit by securing the flanged ends of a number of drive chambers F together and extending a drive shaft of suitable construction therethrough.

In this type of internal combustion engine, the use of a suitable rotary valve is preferred and so shown, but any other suitable valve mechanism may be employed.

The valve K is adapted to be rotated in its seat by the valve drive member $c27$ which is provided with a plurality of arms c37 each of which is provided at its outer end with an upwardly directed pin c38 which fits freely into suitable lugs k1 on the valve K.

A flexible connection is thus provided between the master shaft c11 and the valve K which obviates the necessity of accurate axial alignment between the two members and permits said valve K to remain seated in the port block D in a definite manner.

In operation, this method of engine assembly provides a novel principle of absorbing vibration and engine oscillation, due to variable power loading thereof, by providing immediately adjacent balancing means for oppositely moving reciprocating parts, and utilizing the gyroscopic action of said balancing means to resist said engine oscillation.

Figure 3:
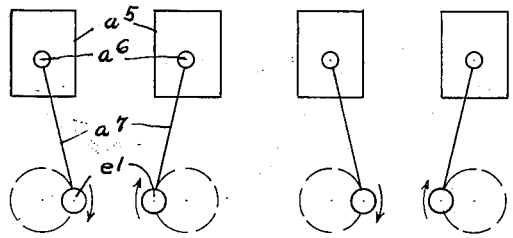
Fig. 3 shows a diagrammatic scheme of balancing reciprocal inertia.
Figure 7:
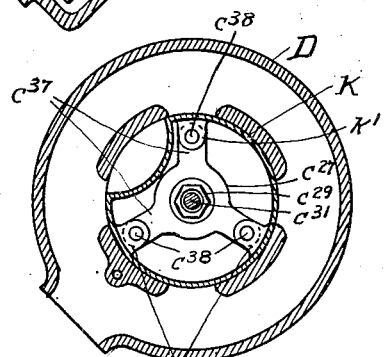
Fig. 7 shows a plan section of a valve and its driving mechanism.
Figure 4:
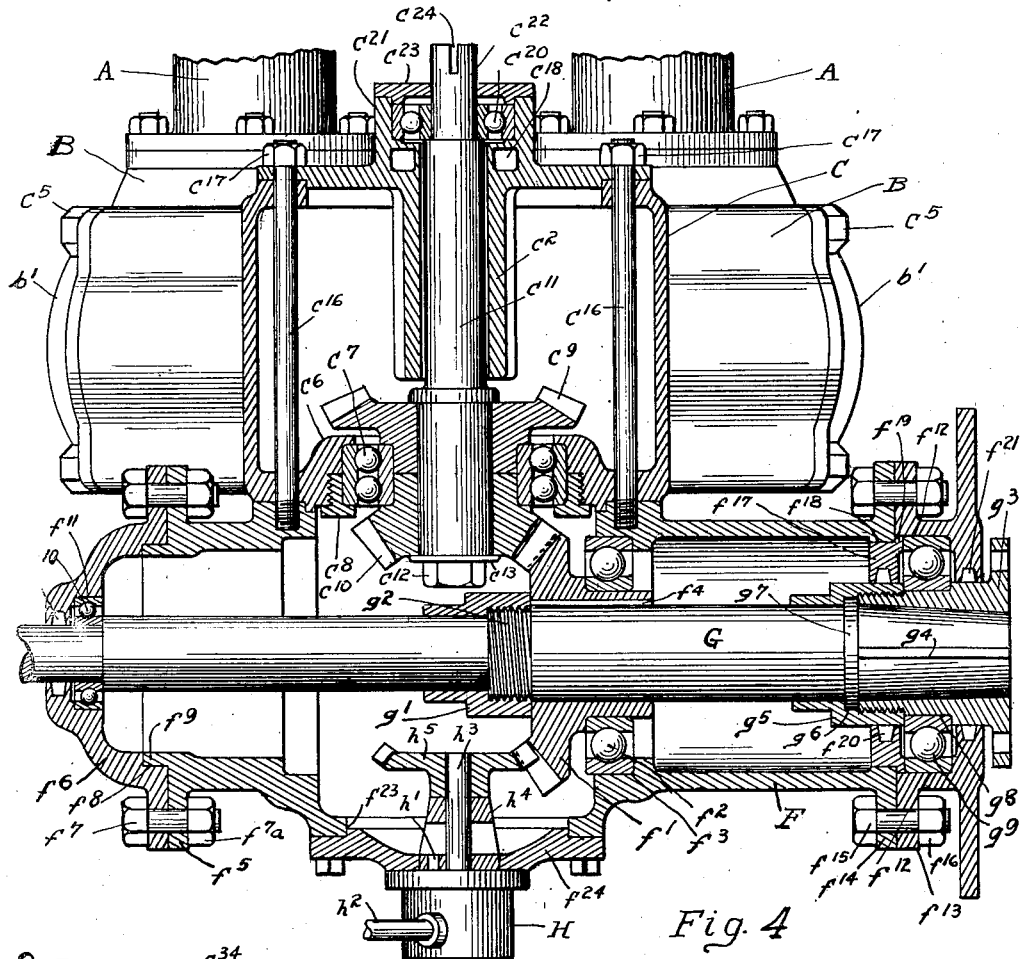
Fig. 4 shows a longitudinal section of the power drive mechanism.

As is shown in the diagrammatic view in Fig. 3, any position of any two adjacent cylinder units provide a balancing action to each other, and furthermore the rotating elements E provide a gyroscopic action against lateral deflection of the engine assembly when the power loading thereof is suddenly changed, thus preventing undesirable stresses in the supports thereof.

A desirable condition of engine stability is thus provided, which permits a lighter construction in the supporting parts thereof, and facilitates the application of such power units where freedom from vibration is desirable.

Having thus described my invention, what I claim and desire to secure by Letters Patent, is;

1. In an internal combustion engine, a connected series of drive chambers, a drive shaft rotatably mounted therein, a central housing of rectangular form secured to each of said drive chambers, plural groups of co-acting individual internal combustion engine units secured to said central housing, each of said engine units provided with a rotating element formed integral with crankshafts in said internal combustion engine units, said rotating element comprising a disk recessed at one end thereof and surrounding rotatably a bearing in the crankcase and said rotating element adapted to balance and absorb reciprocating energy and a plurality of said described and oppositely rotating elements adapted to resist by gyroscopic action the torque reactance on the drive shaft of said internal combustion engine.

2. In an internal combustion engine, a plurality of individual internal combustion engines units grouped around a central mastershaft and geared thereto, each of said internal combustion engines units provided with a rotating element formed integral with a crankshaft, said rotating element comprising a disk recessed at one end thereof and surrounding rotatably a bearing in the crankcase and adapted to balance and absorb reciprocating energy, a plurality of said rotating elements adapted to rotate oppositely in direction to other similar rotating elements to form a balancing unit for said internal combustion engine.

3. In an internal combustion engine a central housing provided with plural sides having an opening therein, the axial ends of said central housing provided with bearings, a mastershaft mounted rotatably in said bearings and provided with a master gear within said central housing, a plurality of individual cylinder units provided with a crank case secured each to a side of said central housing, a piston and connecting rod provided in said cylinders, said connecting rod adapted to rotate a crankshaft in said crank case, said crankshaft provided with a disk rotatable therewith and recessed at one end thereof and surrounding rotatably a bearing in said crank case, said crankshaft provided with a pinion extending into said central housing and adapted to mesh with and rotate said master gear.

JOHN BRAUNWALDER.